D. S. BEALS,

Assignor, by mesne assignments, to H. ANDERSON.

Railway Draw Bar.

No. 9,401. Reissued Oct. 12, 1880.

Witnesses:
James H. Hunter.
James E. Taylor.

Inventor:
D. S. Beals
by J. C. Fheaker
Attorney.

N. PETERS, PHOTO-LITHOGRAPHER, WASHINGTON, D. C.

UNITED STATES PATENT OFFICE.

DAVID S. BEALS, OF DETROIT, MICHIGAN, ASSIGNOR, BY MESNE ASSIGNMENTS, TO HORATIO ANDERSON, OF CHICAGO, ILLINOIS.

RAILWAY DRAW-BAR.

SPECIFICATION forming part of Reissued Letters Patent No. 9,401, dated October 12, 1880.

Original No. 93,584, dated August 10, 1869. Application for reissue filed July 22, 1880.

*To all whom it may concern:*

Be it known that I, DAVID S. BEALS, of the city of Detroit, State of Michigan, have invented a new and useful Improvement in Draw-Bars for Railroad-Cars; and I do hereby declare the following to be a sufficiently full, clear, and exact description to enable one skilled in the art to which my invention appertains to carry it into effect, reference being had to the accompanying drawings, which are made part of this specification.

My invention consists, primarily, in constructing the front end of the draw-bar or draw-head with one or more enlargements or shoulders, to serve, by coming in contact in its movement with the front sill of the car, as stops to protect the draw and buffer spring or springs from undue strain, and to support the draw-bar in case of the failure of said springs.

It further consists, in combination with the above, in a superior mode of applying and supporting the draw-bar and the draw and buffer springs.

Figure 1:
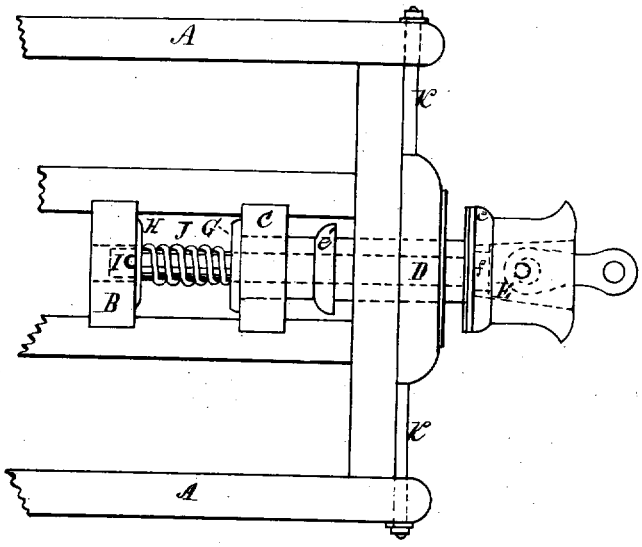
Figure 2:
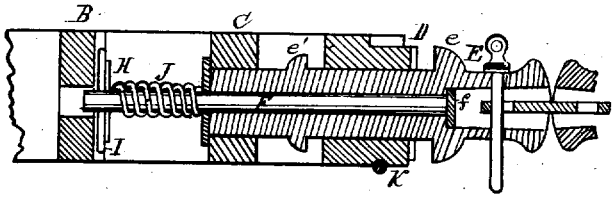

In the drawings, Figure 1 represents a plan view of one end of the bed-frame of a car provided with my improved draw-bar arrangements, and Fig. 2 a vertical longitudinal section of the same.

A represents the bed-frame of the car, which may be constructed of the usual form and material, having in it, at each end, in the form of a pair of cross-timbers, the sills B C, arranged at a suitable distance from the ends, between two central longitudinal sills and a central protuberance or buffer-plate, D, on the outer side of each end sill, each being suitably perforated, as provision for the reception of the draw-head or draw-bar and its appurtenances.

E represents the draw-head or draw-bar, which may be constructed in any usual or suitable manner, and is provided on its outer or front end with a suitable coupling, and at a suitable distance apart, and in such relative position as to be on each side of the front sill of the frame when in position, as represented, with a pair of enlargements or shoulders, *e e'*, which, in the normal position of the parts as represented, are at a distance from the respective sides of said end piece equal to the desired extent of the movement in each direction, and which, by coming in contact with said surfaces, stop the movement, and thus prevent the strain of the springs or the separation of the draw-head in case of the failure of said springs. The rear end of the draw-head E extends through the sill C and is supported thereby.

F represents the draw-bar proper, which, being secured in the draw-head E by means of a suitable head, *f*, projects back a sufficient distance to receive on its inner or rear end, between the sills B C, the draw and buffer spring.

G H represent a pair of loose disks or washers placed loosely on the draw-bar F, and abutting respectively in the normal position of the parts against the sills B and C, as shown.

I represents a pin traversing the rear end of the draw-bar F, to secure on it the disks G H.

J represents the draw and buffer spring, which is placed loosely on the draw-bar F between the disks G H.

K represents a truss-rod extending across the frame A, beneath the buffer-plate D, to support said plate and the front sill of the frame, on which the greatest strain falls.

In operation, as the draw-head E recedes on its collision by or with another, the disk G slides back on the rod F, compressing the spring J, which abuts in this part of the operation against the sill B, which thus serves to deaden the shock which would otherwise result. On the compression of the spring J to the extent which has been deemed advisable, the shoulder or stop *e*, coming in contact with the buffer-plate D, arrests the movement and prevents the undue straining of the spring. In starting up the sudden shock is imparted, through the head E, bar F *f*, pin I, and disk H, to, and is taken up by, the spring J, which in this part of the operation abuts against the sill C, and the compression of which in this case is limited by the stop *e'* coming in contact with the rear surface of the front sill. The stop *e'* serves, further, in the case of the failure of the spring, to prevent the withdrawal of the draw-bar.

The stops *e e'*, it will thus be seen, both save the spring from strain and breakage, and in the case of the failure of the spring from any cause prevent any accident resulting therefrom. Being formed as shown and described, the draw-head provided with them may be made as readily and nearly as cheaply as without.

The arrangement for applying the spring is strong, simple, and compact.

By arranging the draw-bar with its stops at the front end, and all operating within the bed-frame of the car, the draft is brought in line with said frame or sills, where the car is best adapted to receive it, and the necessity for separate attachment is obviated.

The truss-rod K serves to support the center of the front side, where the weight of the appliance is sustained, and greatly augments the strength of the frame.

Having thus described my invention, I claim as new therein and desire to secure by Letters Patent—

1. The draw-head E, with a shoulder or enlargement, *e*, combined with the front sill of the car, in the manner substantially as described.

2. The draw-head E, with a shoulder or enlargement, *e'*, combined with the front sill of the car, in the manner substantially as described.

3. The draw-head E, with shoulders or enlargements *e e'*, combined with the front sill of the car, in the manner substantially as described.

4. The combination of the draw-head E, shoulders *e e'*, draw-bar F, disks G H, pin I, spring J, and sills B C, constructed and arranged substantially as described, for the purposes set forth.

To the above specification of my improvement in draw-bars I have signed my hand.

DAVID S. BEALS.

Witnesses:

A. DARROW,

F. E. BEAL.